(12) United States Patent
Ciuperger

(10) Patent No.: US 10,717,410 B2
(45) Date of Patent: Jul. 21, 2020

(54) VEHICLE PERIMETER ALERT SYSTEM

(71) Applicant: Vasile Ciuperger, Port St. Lucie, FL (US)

(72) Inventor: Vasile Ciuperger, Port St. Lucie, FL (US)

(*) Notice: Subject to any disclaimer, the term of this patent is extended or adjusted under 35 U.S.C. 154(b) by 0 days.

(21) Appl. No.: 16/075,772

(22) PCT Filed: Feb. 4, 2017

(86) PCT No.: PCT/US2017/016611
§ 371 (c)(1),
(2) Date: Aug. 6, 2018

(87) PCT Pub. No.: WO2017/136796
PCT Pub. Date: Aug. 10, 2017

(65) Prior Publication Data
US 2019/0039566 A1 Feb. 7, 2019

Related U.S. Application Data

(60) Provisional application No. 62/291,412, filed on Feb. 4, 2016.

(51) Int. Cl.
*B60R 25/10* (2013.01)
*B60R 25/31* (2013.01)
*G08B 13/196* (2006.01)
*B60R 25/30* (2013.01)

(52) U.S. Cl.
CPC ........ *B60R 25/1004* (2013.01); *B60R 25/305* (2013.01); *B60R 25/31* (2013.01); *G08B 13/19647* (2013.01); *B60R 2025/1013* (2013.01)

(58) Field of Classification Search
CPC ... B60R 25/1004; B60R 25/305; B60R 25/31; B60R 2025/1013; G08B 13/19647
USPC ......................................................... 340/426
See application file for complete search history.

(56) References Cited

U.S. PATENT DOCUMENTS

| | | | | |
|---|---|---|---|---|
| 6,021,373 A * | 2/2000 | Zuercher | ............... | B60Q 9/006 180/271 |
| 2004/0246112 A1* | 12/2004 | Strumolo | ............... | B60Q 9/008 340/435 |
| 2006/0220843 A1* | 10/2006 | Broad | .................. | G08B 25/009 340/539.23 |
| 2007/0182527 A1* | 8/2007 | Traylor | .................. | B60Q 9/008 340/435 |
| 2011/0285519 A1* | 11/2011 | Scheuermann | .......... | B60Q 1/50 340/425.5 |
| 2012/0049870 A1* | 3/2012 | Salter | .................. | B60R 13/0212 324/686 |
| 2012/0319840 A1* | 12/2012 | Amis | .................. | G08B 25/016 340/540 |
| 2014/0062686 A1* | 3/2014 | Florio | .................. | B60R 25/102 340/426.18 |

(Continued)

*Primary Examiner* — Ojiako K Nwugo
(74) *Attorney, Agent, or Firm* — Nancy J. Flint, Attorney at Law, P.A.; Nancy J. Flint, Esq.

(57) ABSTRACT

A vehicle perimeter alert system and, more particularly, to a vehicle perimeter alert system which is capable of detecting, using a plurality of proximity sensors such as infrared sensors or radar sensors and a display unit, the approach of any unauthorized person to a vehicle, is disclosed. Video cameras may be associated with one or more of the proximity sensors to provide a visual image display to the user of the system.

10 Claims, 17 Drawing Sheets

(56) References Cited

U.S. PATENT DOCUMENTS

| | | | |
|---|---|---|---|
| 2015/0116107 A1* | 4/2015 | Fadell | G08B 19/005 340/501 |
| 2016/0059777 A1* | 3/2016 | Malone | B60K 35/00 340/426.1 |
| 2016/0166156 A1* | 6/2016 | Yuen | A61B 5/0002 340/573.1 |
| 2016/0189513 A1* | 6/2016 | Sloo | G08B 21/02 340/522 |
| 2018/0126901 A1* | 5/2018 | Levkova | B60Q 9/00 |

* cited by examiner

VEHICLE PERIMETER ALERT SYSTEM

FIELD OF THE INVENTION

The present invention relates to a vehicle perimeter alert system and, more particularly, to a vehicle perimeter alert system which is capable of detecting, using a plurality of proximity sensors such as infrared sensors or radar sensors and a display unit, the approach of any unauthorized person to a vehicle. Video cameras may be associated with one or more of the proximity sensors to provide a visual image display to the user of the system.

BACKGROUND OF THE INVENTION

Alarm systems are known for the purpose of securing a defined area from unauthorized intrusion or trespass. The defined area that is secured by the alarm system will usually comprise a closed area, such as an area in the vicinity of a vehicle.

Alarm systems have certain basic elements in common; they include one or more sensors that are used to sense an entry event or other activity that could be viewed as an unauthorized presence coupled via a communication link to a central unit. When an entry into the defined area is sensed by the sensor, a signal is sent to the control unit, which, if armed, generates an alarm signal. The alarm signal, in turn, may be used locally to sound an audible alarm, such as a loud siren or loud bell (intended to scare off the would-be intruder and to draw attention to the fact that an intrusion or other violation has been detected). The alarm signal may also be used to signal a remote location, such as a police station or a neighboring facility, of the violation that has been detected.

SUMMARY OF THE INVENTION

The invention relates to a vehicle perimeter alert system having a plurality of proximity sensors that continuously monitor a plurality of defined areas. When any of the proximity sensors detects movement in its monitored area, the system receives a signal from those proximity sensors that an abnormal situation has occurred and the system performs a predetermined alarm protocol. The alarm protocol may include verbal and visual cues to indicate to the user of the system that an abnormal condition has occurred, specifically that movement has been detected in one or more of the monitoring areas.

The vehicle perimeter alert system further optionally comprises a plurality of video cameras associated with one or more of the proximity sensors that provide a visual display on a display unit to the user of the system. The display unit may be located inside the vehicle, and/or it may be located remotely.

The vehicle perimeter alert system comprises a plurality of proximity sensors each capable of producing a signal upon detecting motion within a monitoring area; a computerized monitoring control unit on the basis of output signals from the proximity sensors; one or more alarms under control of the computerized monitoring control unit; a visual and audio display unit housing the computerized monitoring control unit and the alarm; and optionally one or more video cameras associated with one or more of the proximity sensors, each capable of producing data to provide a visual image display to the user of the system. The plurality of proximity sensors and optional video cameras are mounted on the exterior of the vehicle in a manner to provide 360° coverage of the vicinity of the vehicle. The video and audio display unit housing the computerized monitoring control unit and alarm, and where present the optional video display unit, are mounted on predetermined portions of the vehicle and/or are located remotely. When the computerized monitoring control unit receives one or more signals from a proximity sensor it determines that an abnormal state has occurred, causing one or more alarms to execute. The alarm(s) alert the user to the visual and audio display unit for a visual indication of the entry event.

BRIEF DESCRIPTION OF THE DRAWINGS

Advantages and features of the invention will be described in conjunction with the following drawings, wherein like numerals indicate like elements.

DETAILED DESCRIPTION OF THE INVENTION

Figure 1:
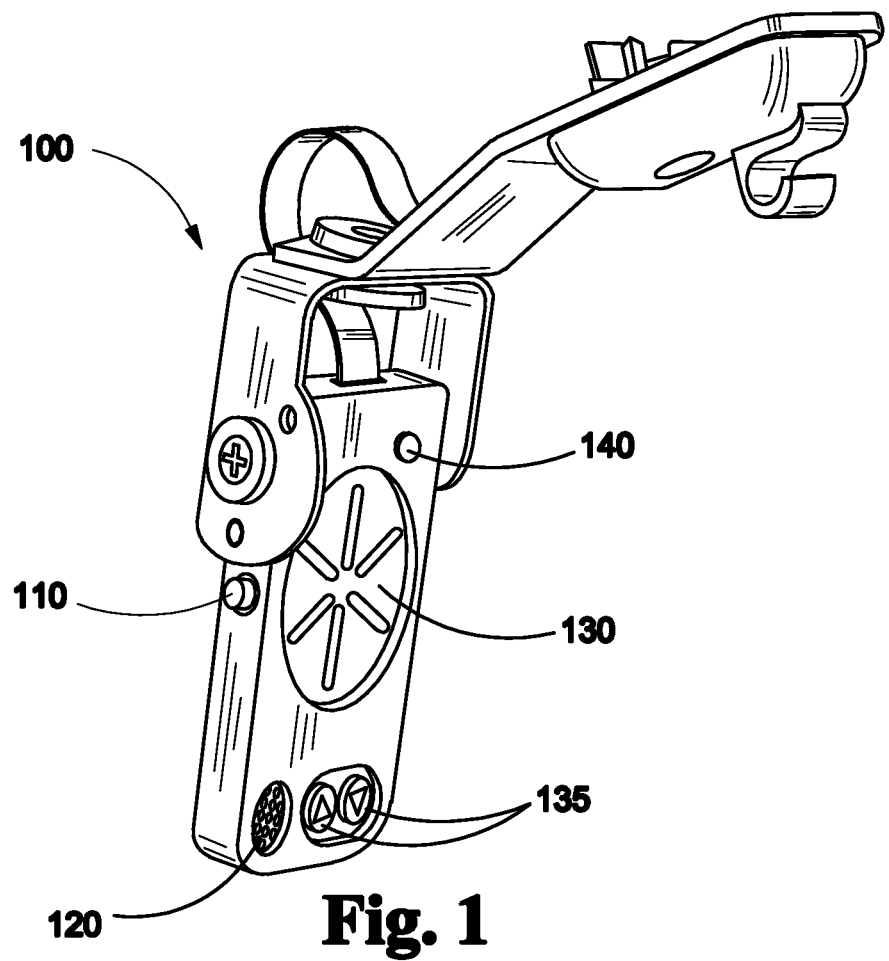
FIG. 1 is view of a video and audio display unit according to one embodiment of the invention.

According to one embodiment of the invention, the vehicle perimeter alert system comprises a plurality of proximity sensors each capable of producing a signal upon detecting motion within a monitoring area; a computerized monitoring control unit on the basis of output signals from the proximity sensors; one or more alarms under control of the computerized monitoring control unit; a visual and audio display unit housing the computerized monitoring control unit and the alarm; and optionally one or more video cameras associated with one or more of the proximity sensors, each capable of producing data to provide a visual image display to the user of the system. The plurality of proximity sensors and optional video cameras are mounted on the exterior of the vehicle in a manner to provide 360° coverage of the vicinity of the vehicle. The video and audio display unit housing the computerized monitoring control unit and alarm, and where present the optional video display unit, are mounted on predetermined portions of the vehicle and/or are located remotely. When the computerized monitoring control unit receives one or more signals from a proximity sensor it determines that an abnormal state has occurred, causing one or more alarms to execute. The alarm(s) alert the user to the visual and audio display unit for a visual indication of the entry event.

The proximity sensors are physically housed in a pod, which pod may be installed on a vehicle to be protected. In one embodiment of the invention, more than one pod is installed on the vehicle. A pod may house a plurality of proximity sensors. In one embodiment, each pod houses three (3) proximity sensors. The proximity sensors are set at an angle to monitor motion within a monitoring area. In one embodiment, adjacent proximity sensors are set at angles such that there monitoring areas overlap to provide uninterrupted monitoring of the vicinity of the vehicle. In one embodiment, two (2) pods housing three (3) proximity sensors each provide 200° of coverage of the vicinity of the vehicle, for a total of 400° in overlapped coverage.

The proximity sensors detect the presence of nearby objects without any physical contact by emitting an electromagnetic field or a beam of electromagnetic radiation (infrared, for instance), and looking for changes in the field or return signal. Different proximity sensor targets demand different sensors. For example, a capacitive or photoelectric sensor might be suitable for a plastic target; an inductive proximity sensor always requires a metal target. In one embodiment of the invention, the proximity sensors comprise passive infrared (PIR)-based sensors. In one embodiment of the invention, the proximity sensors are ZMOTION® Intrusion Detection Solution sensor model Z8FS021A available from Zilog, Inc. The ZMOTION® Intrusion Detection Solution sensor model Z8FS021A has the following features:

- MCU, Lens, and PIR Sensor;
- eZ8 MCU core;
- 2 KB in-circuit programmable Flash available for application code;
- Single-pin debug with unlimited breakpoints;
- Internal precision oscillator running at 5.53 MHz;
- External oscillator operating up to 20 MHz;
- Sigma Delta ADC with up to 6 channels single ended or 3 channels differential available;
- On-chip analog comparator with independent programmable reference voltage;
- Full-duplex UART with dedicated BRG;
- Two 16-bit timers with input capture, output compare, and PWM capability (11 modes total);
- Watchdog timer (WDT) with dedicated internal oscillator; and
- PIR software engine controlled and monitored through software API registers.

Other proximity sensors now known or later developed may be used within the spirit of the invention, including but not limited to capacitive; capacitive displacement sensor; Doppler effect (sensor based on effect); eddy-current; inductive; laser rangefinder; magnetic, including magnetic proximity fuse; passive optical (such as charge-coupled devices); photocell (reflective); radar; reflection of ionising radiation; sonar (active or passive); ultrasonic sensor (sonar which runs in air); fiber optics sensor; and Hall effect sensor.

The one or more proximity sensors are, independently of each other, disposed on a PCB within the pod such that each sensor is connected directly to the video and audio display unit. The pods are attached to the vehicle which vicinity is to be monitored. In one embodiment, the pods are attached to the roof of the vehicle. Where multiple pods are used, the pods are typically attached to different parts of the vehicle. The wiring of the vehicle perimeter alert system includes power source wiring and data wiring with connections to connect the PCBs in the interior of the pods on which the proximity sensors are mounted to the video and audio display unit. In one embodiment, the connections from the video and audio display unit to the PCBs comprise micro-USB connections.

The video and audio display unit is wired to a power source. In one embodiment, the power source comprises a 12V power source within the vehicle, for instance the dome light. The connection between the video and audio display unit and the PCBs provide power to the proximity sensors and also allow data flow from the proximity sensors to the video and audio display unit.

The video and audio display unit is attached to a portion in the interior of the vehicle to be visible to the user. In one embodiment, the video and audio display unit is removably attached to a portion of the interior of the vehicle. In one embodiment, the video and audio display unit is removably attached to the sun visor of the vehicle.

The video and audio display unit comprises the computerized monitoring control unit which monitors signals from the proximity sensors via the wiring and which also controls the visual alarms and audio alarms. The video and audio display unit includes a potentiometer that can be adjusted via a setting button disposed on the video and audio display unit. Adjustments to the potentiometer increase or decrease the signal output from the proximity sensors.

The proximity sensors generate an invisible field that surround the vehicle and detect the presence of an intruder in the monitoring area. The computerized monitoring control unit regularly scans for signals from the proximity sensors according to a predetermined schedule when set to active mode. Once each proximity sensor warms up, it detects heat and movement in its monitoring area. The computerized monitoring control unit is programmed to sound an alarm if a predetermined number of monitoring areas detect movement in the monitoring area and if infrared energy levels of each proximity sensor change within a predetermined length of time. The computerized monitoring control unit can be set to idle upon command of the user, for example when the vehicle is in motion. When an intrusion is sensed in a monitoring area, a signal indicating an abnormal state has occurred within that monitoring area is sent from the proximity sensor monitoring that area to the computerized monitoring control unit. Circuits in the computerized monitoring control unit respond by controlling a speaker to provide an audio warning signal to the user. A visual warning is also given, which visual warning may include a visual indicator of the proximity sensor(s) that sent the signals indicating intrusion. The occurrence of this intrusion can be reported to the owner of the vehicle being monitored, or to a designated law enforcement agency, using conventional communication techniques (e.g., a beeper, cellular telephone link, RF link, or equivalent communication link) and/or stored in the memory elements of the system for later reporting to the owner.

The invention, in addition to relating to a vehicle perimeter alert system that performs the sensing and warning functions described, also relates to a method of protecting a prescribed vehicle by notifying a person approaching the object, which person might inflict damage to the object, to back away from the object or else an alarm will be triggered. The audio speaker may also be used to communicate to the owner the status of the system, e.g., whether the system is armed or disarmed, and whether and when a particular type of violation occurred. Such voice synthesis technology allows the alarm system to efficiently and effectively provide needed warnings when the zone around the protected vehicle is violated, and to communicate to the owner. Moreover, when the system is used to protect a vehicle, use of vocal communication optionally permits the alarm system to utilize the existing components (e.g. speakers) of the vehicle's radio or tape player, thereby reducing the cost of the system. Alternatively, the alarm system may be a self-contained unit, including a speaker and power source, which unit can be placed by its owner near whatever vehicle the owner desires to protect.

A feature of the invention is the ability to sense an intrusion into an area around a vehicle when the user may be otherwise occupied inside the vehicle prior to the actual occurrence of an event resulting in damage to the vehicle or harm to the user. For example, law enforcement officers may activate the system while inside the vehicles performing functions and not actively monitoring the exterior of their vehicle.

One use of the invention is to protect a vehicle of a law enforcement officer. However, any vehicle could be protected using the vehicle perimeter alert system, such as a boat or a motorcycle.

Turning to the figures, FIG. 1A is view of a video and audio display unit 100 according to one embodiment of the invention. Video and audio display unit 100 comprises a computerized monitoring control unit having a microprocessor circuit (not shown) that receives and processes digital data according to a prescribed sequence, or program, which is stored in a memory device. The microprocessor circuit is programmed to monitor proximity sensors (shown in FIG. 2), as well as any control or other signals received from any other sources, such as arm/disarm signals that may be generated in any conventional manner. The microprocessor circuit program defines a prescribed response, such as the sounding of an audio alarm through speakers 120 and/or visual alarm on a video display 130 when an entry into the monitoring area of a proximity sensor is detected. The volume of speakers 120 can be controlled by volume controls 135. In some embodiments, the microprocessor circuit may be further programmed to store the time that an alarm is triggered as the result of an entry into the monitoring area of a proximity sensor, so that such information may be subsequently provided to the owner/operator in a report. Arm or disarm control signals, as well as alarm event signals, are passed to the microprocessor via suitable interface (I/F) circuits. Proximity sensors 210 are detachably coupled to the microprocessor through a connector (shown in FIG. 3). Video and audio display unit 100 includes a voltage regulator (not shown) that receives input power from the vehicle's battery or other external power source, and converts this to the appropriate voltage levels needed to power the vehicle perimeter alert system. Power switch 110 permits the user to turn power on and off to the video and audio display unit 100. Video and audio display unit 100 further includes a stand-by button 140 that permits the user to place the system in stand-by mode or active scanning mode without turning off the power.

Figure 2:
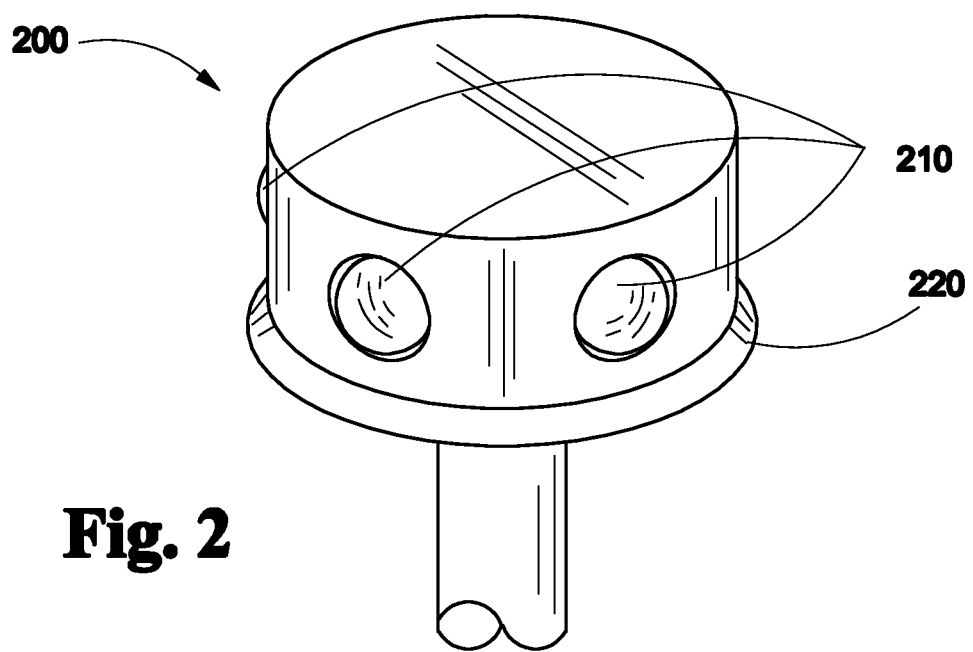
FIG. 2 is a view of a pod housing one or more proximity sensors according to one embodiment of the invention.

FIG. 2 is a view of a pod 200 housing one or more proximity sensors 210 according to one embodiment of the invention. Pod 200 comprises a water-resistant material. Pod 200 is connected to a vehicle by a water-tight seal formed by seal 220.

Figure 3A:
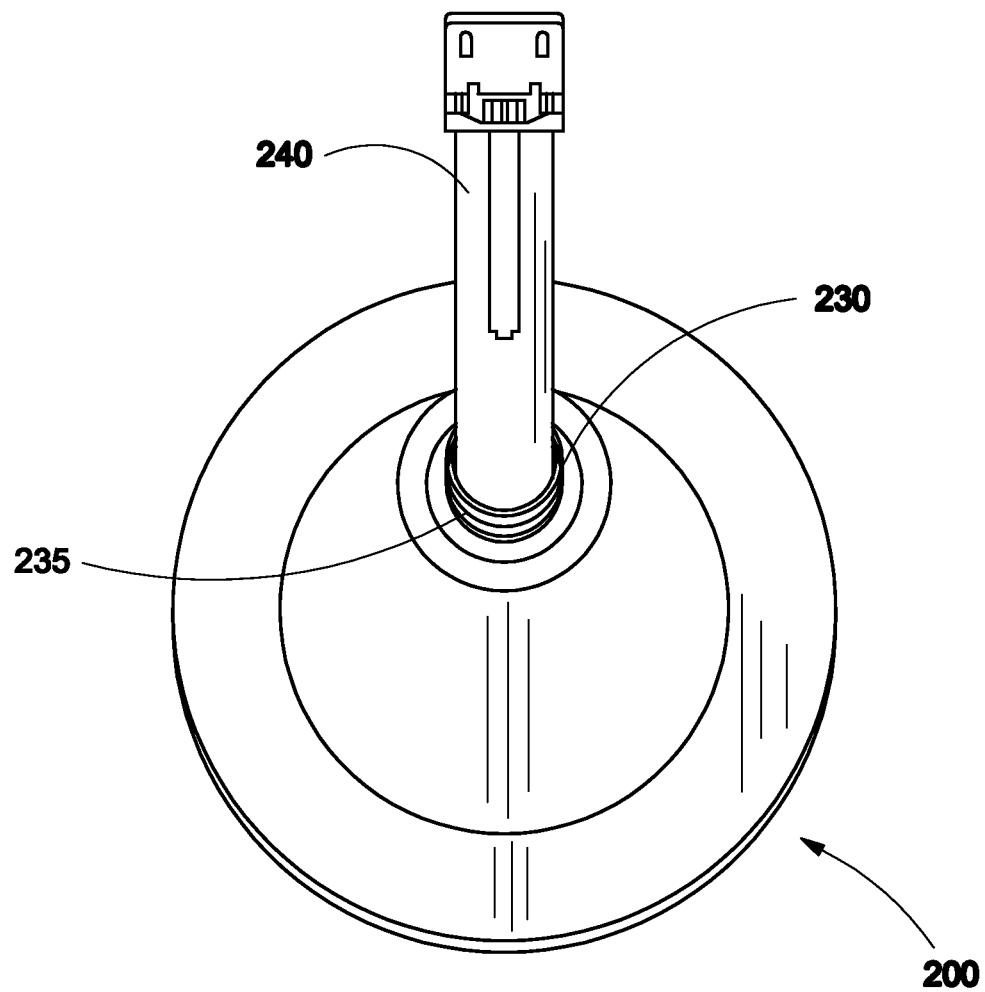
FIGS. 3A-3C are bottom and interior views of the pod of FIG. 2 according to one embodiment of the invention.
Figure 3B:
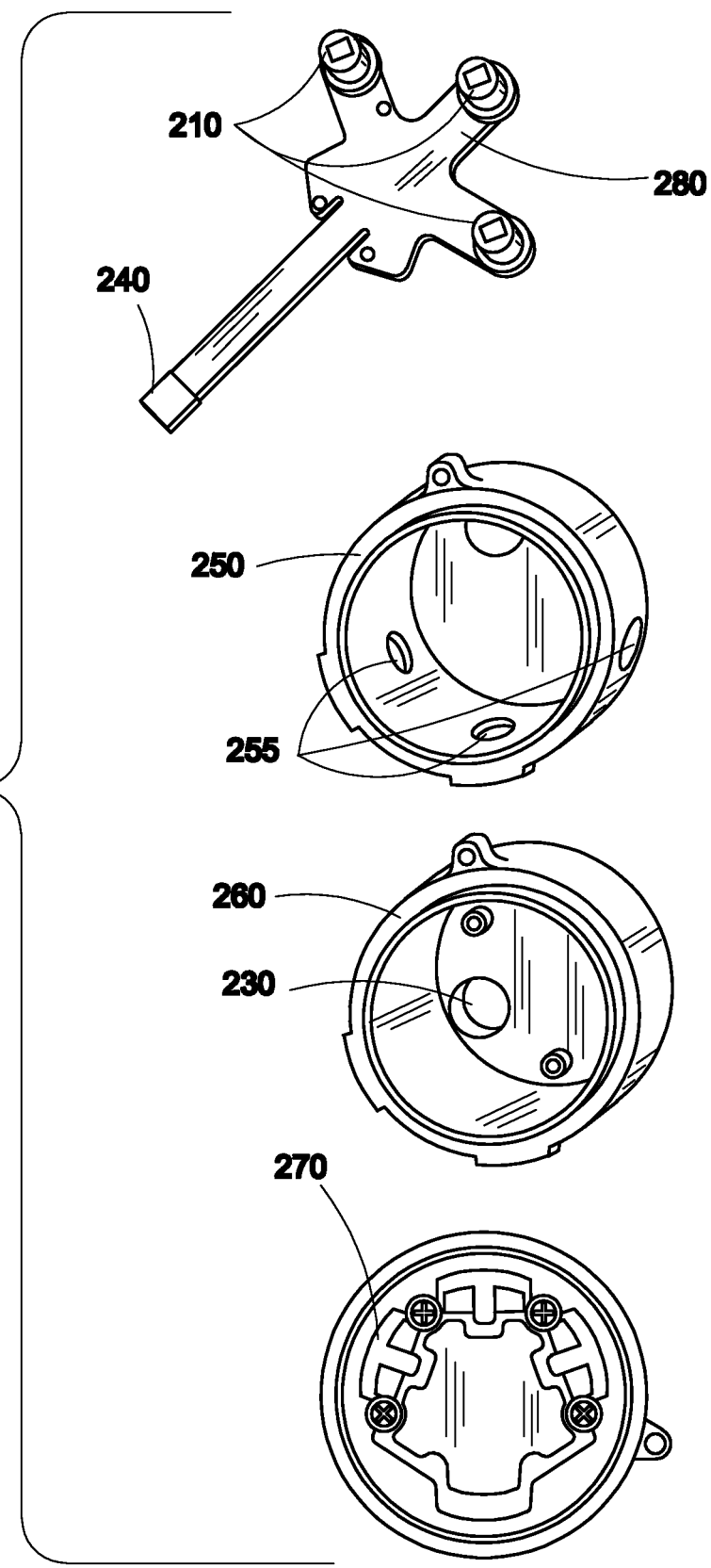
Figure 3C:
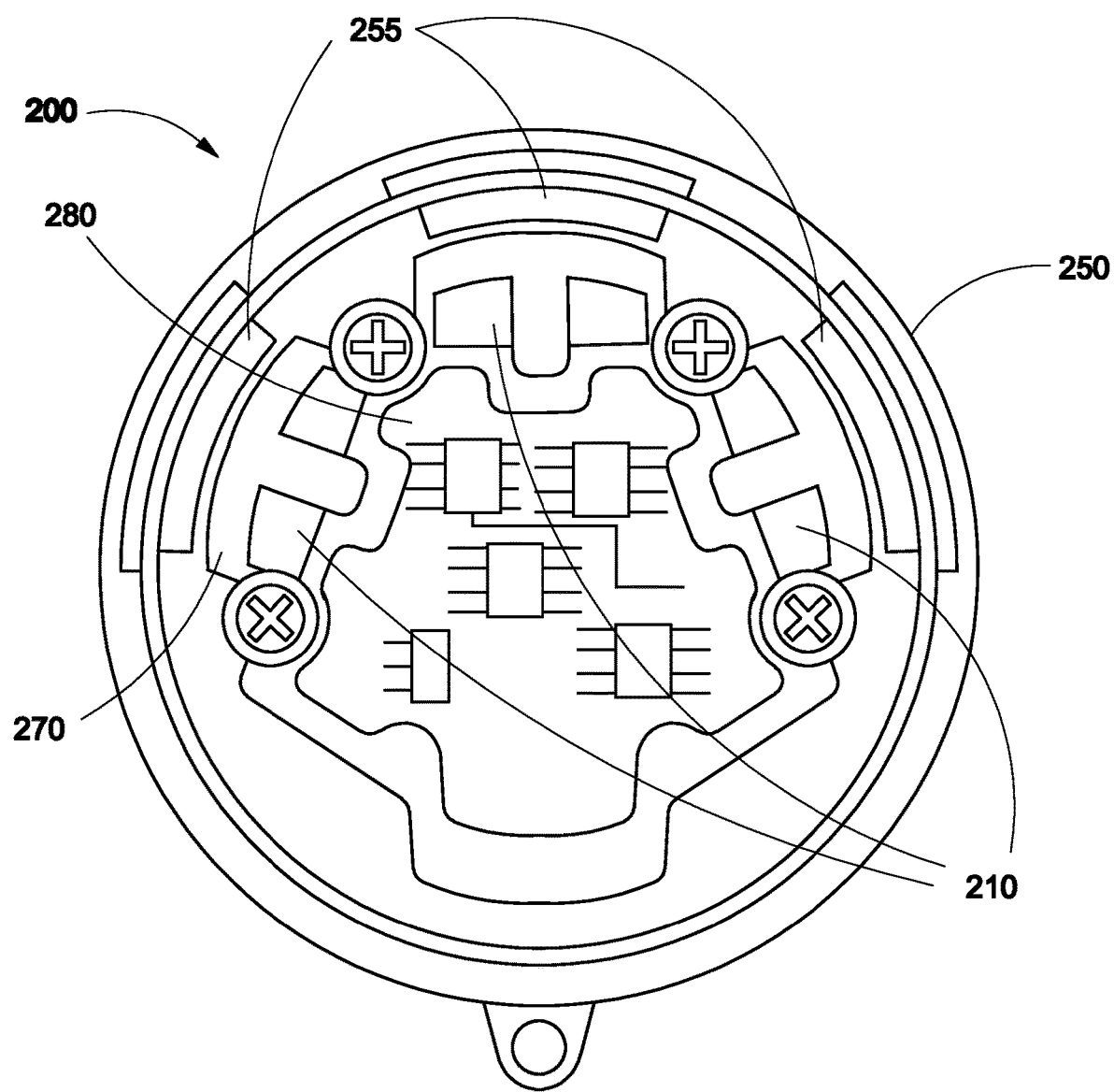

FIGS. 3A-3C are views of the pod 200 of FIG. 2 according to one embodiment of the invention. FIG. 3A depicts a bottom view of pod 200 showing hole 230 through which connector 240 passes from the interior of pod 200 to the interior of the vehicle when pod 200 is installed on that vehicle. A threaded male connector 235 extends from hole 230. Connector 240 comprises wiring that provides power and data connections between the PCB in the interior of pod 200 upon which proximity sensors 210 are disposed and video and audio display unit 100. In the embodiment shown in FIG. 3A, connector 240 comprises a micro-USB connection.

FIG. 3B depicts the elements that comprise pod 200, which includes pod tops 250; pod bottoms 260; proximity sensor supports 270; PCBs 280 to which connectors 240 are attached; and proximity sensors 210. Pod tops 250 comprise a plurality of cavities 255 and pod bottoms 260 comprise hole 230.

FIG. 3C depicts the interior of a pod 200 in assembled form. One PCB 280 is placed substantially flush against the interior top of pod top 250. Three proximity sensors 210 are disposed on PCB 280, which in the embodiment shown are flexible. PCB 280 is flexed such that each proximity sensor 210 mates with a cavity 255. Thereafter a proximity sensor support 270 is disposed over PCB 280 and attached to the interior top of pod top 250. Connector 240 is inserted through hole 230 and thereafter pod bottom 260 is attached to pod top 250. Threaded male connector 235 is passed through a hole made in the vehicle and a lock nut is placed on male threaded connector 235 from the interior of the vehicle to lock pod 200 in place.

Figure 4A:
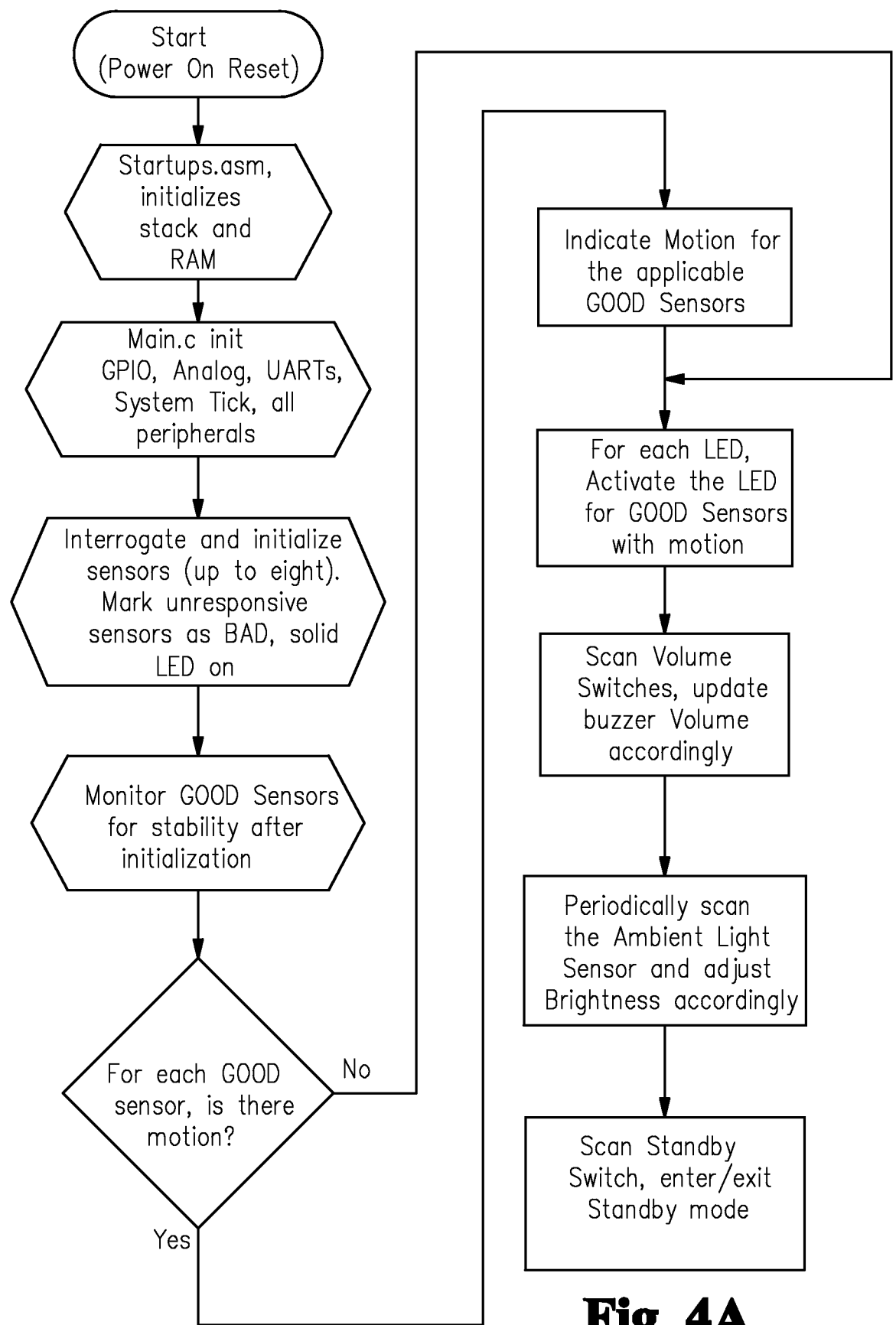
FIG. 4A is a flow diagram of the firmware of the video and audio display unit according to one embodiment of the invention.

FIG. 4A is a flow diagram of the firmware of the video and audio display unit 100 according to one embodiment of the invention. Upon startup, the microprocessor of the video and audio display unit 100 initializes the memory and interrogates proximity sensors 210 to determine whether they are responsive. Only proximity sensors 210 that are determined to be responsive are thereafter monitored by video and audio display unit 100.

Figure 4B:
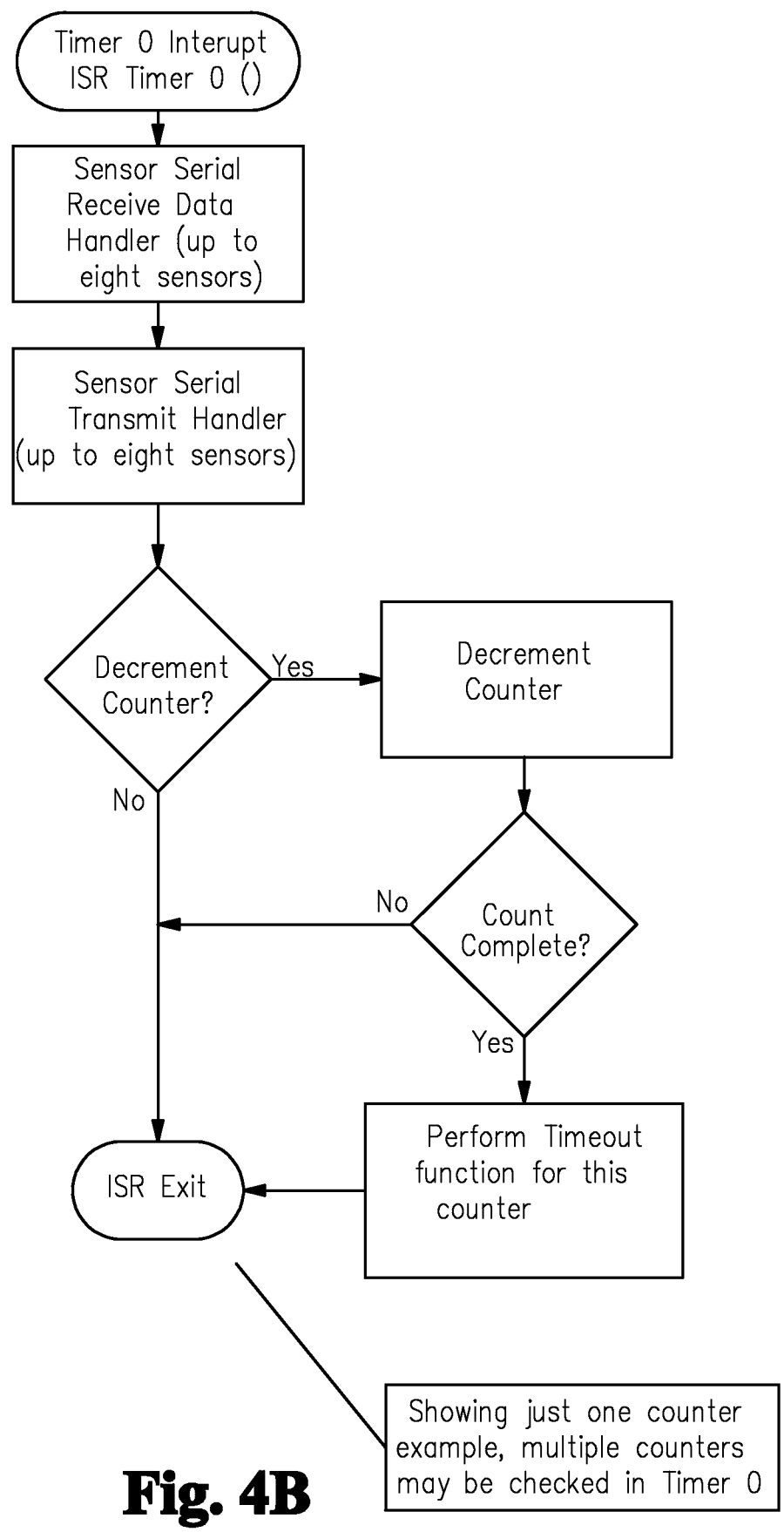
FIG. 4B is a flow diagram of the timer function of the firmware of the video and audio display unit according to one embodiment of the invention.

FIG. 4B is a flow diagram of the timer function of the firmware of the video and audio display unit 100 according to one embodiment of the invention. The microprocessor resets for each responsive proximity sensor 210 and includes a delay to avoid false triggers of each proximity sensor 210 to provide time for the signals sent by the proximity sensor 210 to return to its normal detectible state.

Figure 5A:
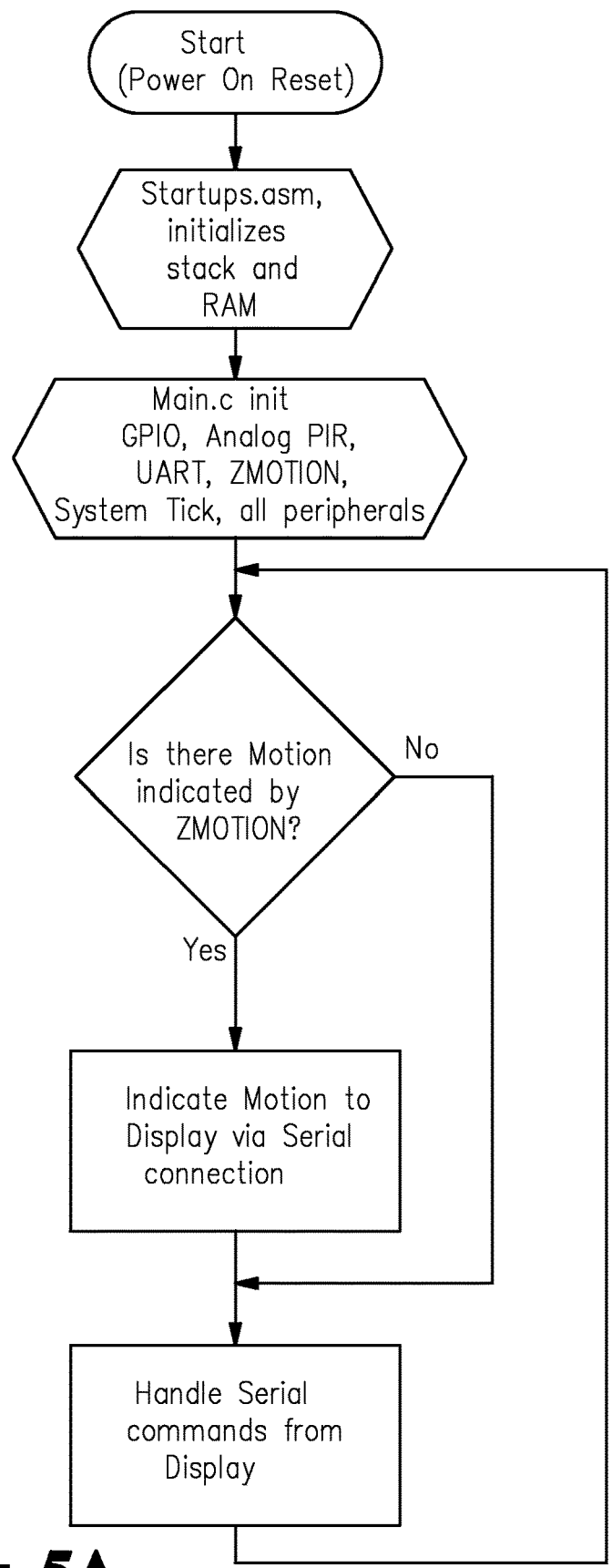
FIG. 5A is a flow diagram of the firmware of the proximity sensors according to one embodiment of the invention.

FIG. 5A is a flow diagram of the firmware of the proximity sensors according to one embodiment of the invention. Upon powering of video and audio display unit 100, proximity sensors 210 that were determined to be responsive continuously monitor a preset monitoring area. If motion is detected within the monitoring area, the proximity sensor 210 sends a signal indicating motion to video and audio display unit 100. There is a boot up sequence that the video and audio display unit 100 monitors and tests each proximity sensor 210 to confirm stability, temperature and proper sensing of each proximity sensor 210.

Figure 5B:
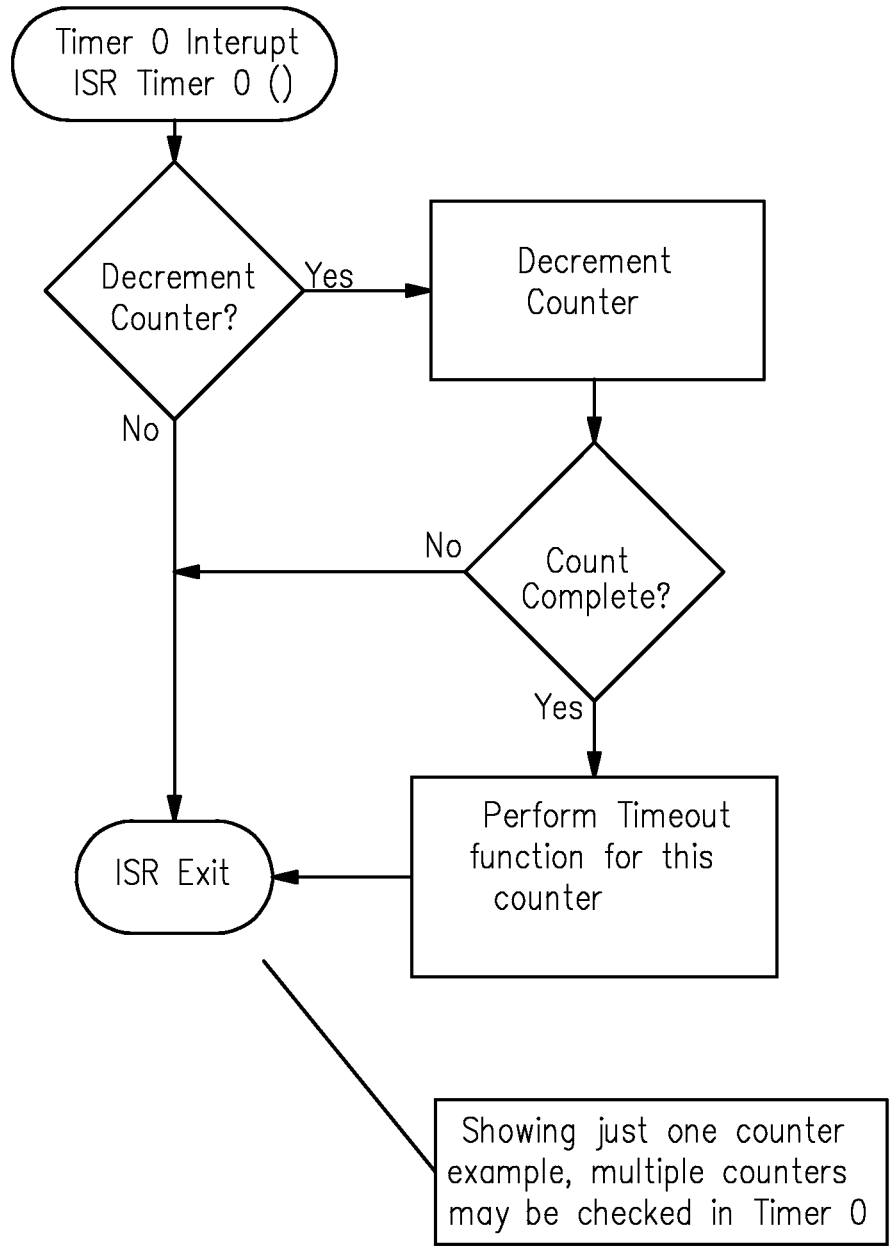
FIG. 5B is a flow diagram of the timer function of the firmware of the proximity sensors according to one embodiment of the invention.

FIG. 5B is a flow diagram of the timer function of the firmware of the proximity sensors according to one embodiment of the invention. The microprocessor resets for each responsive proximity sensor 210 and includes a delay to avoid false triggers of each proximity sensor 210.

Figure 6:
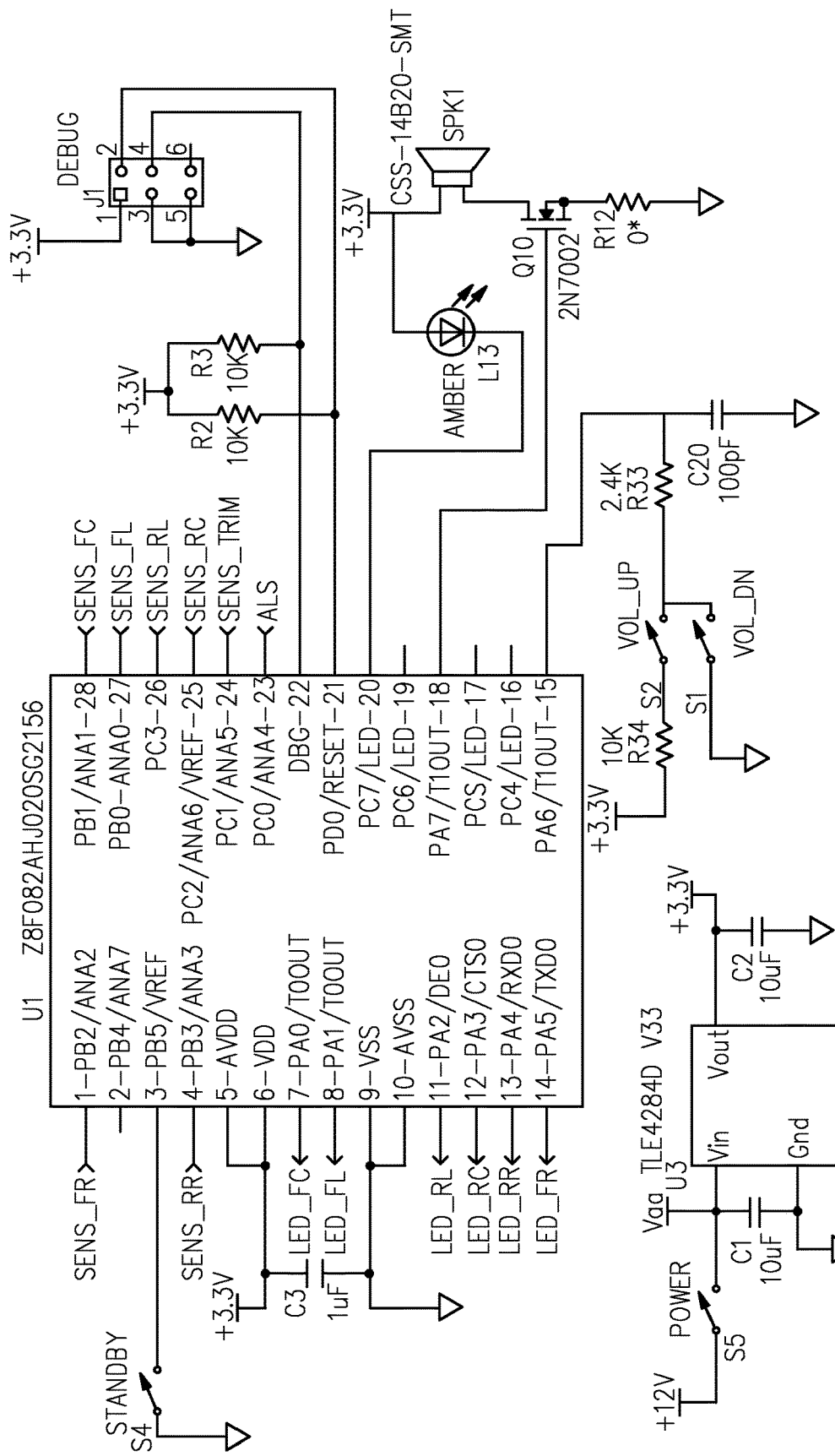
FIGS. 6-10B depict electrical schematic diagrams of the computerized monitoring control unit of the vehicle perimeter alert system according to one embodiment of the invention.
Figure 7:
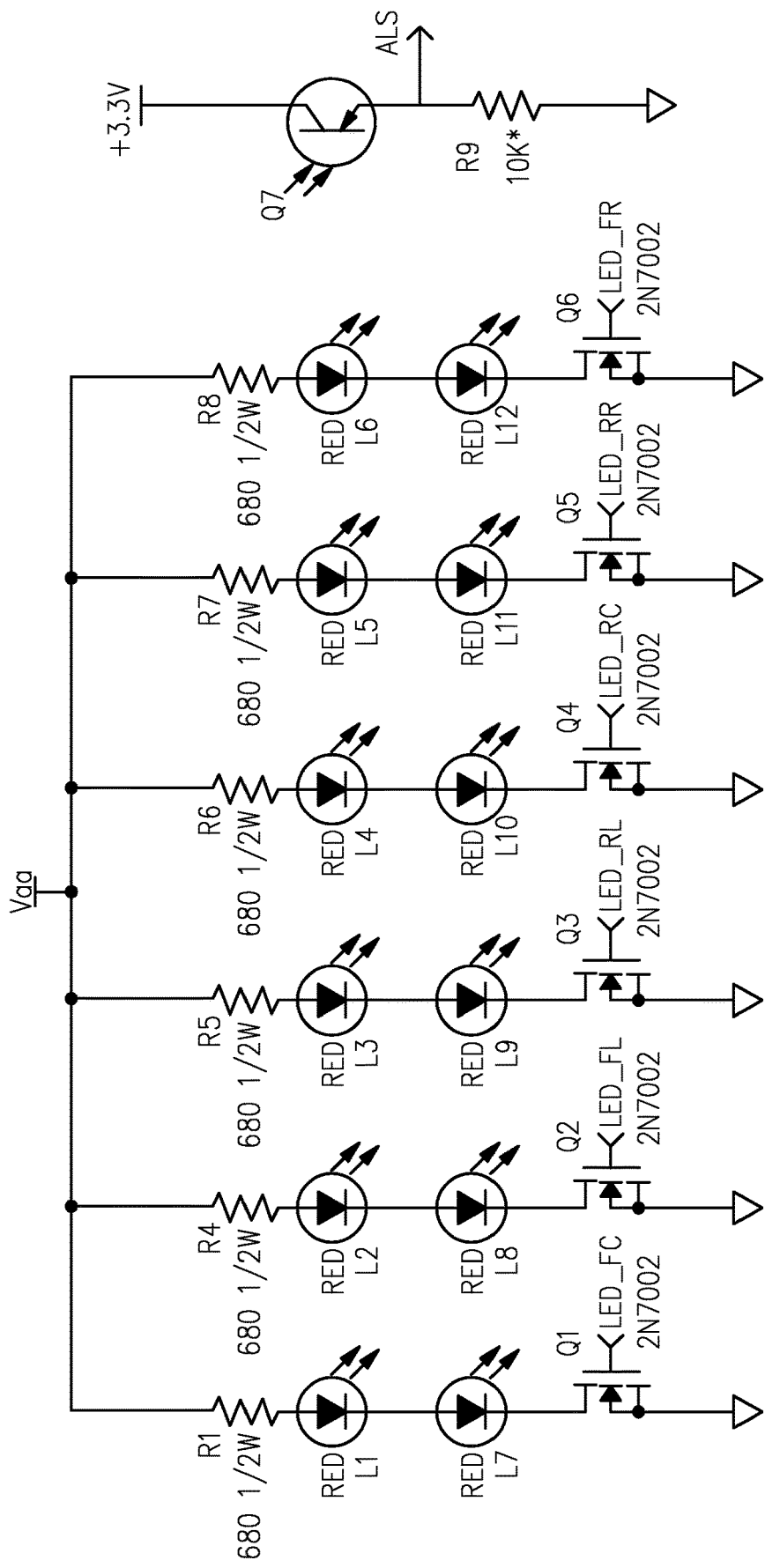
Figure 8:
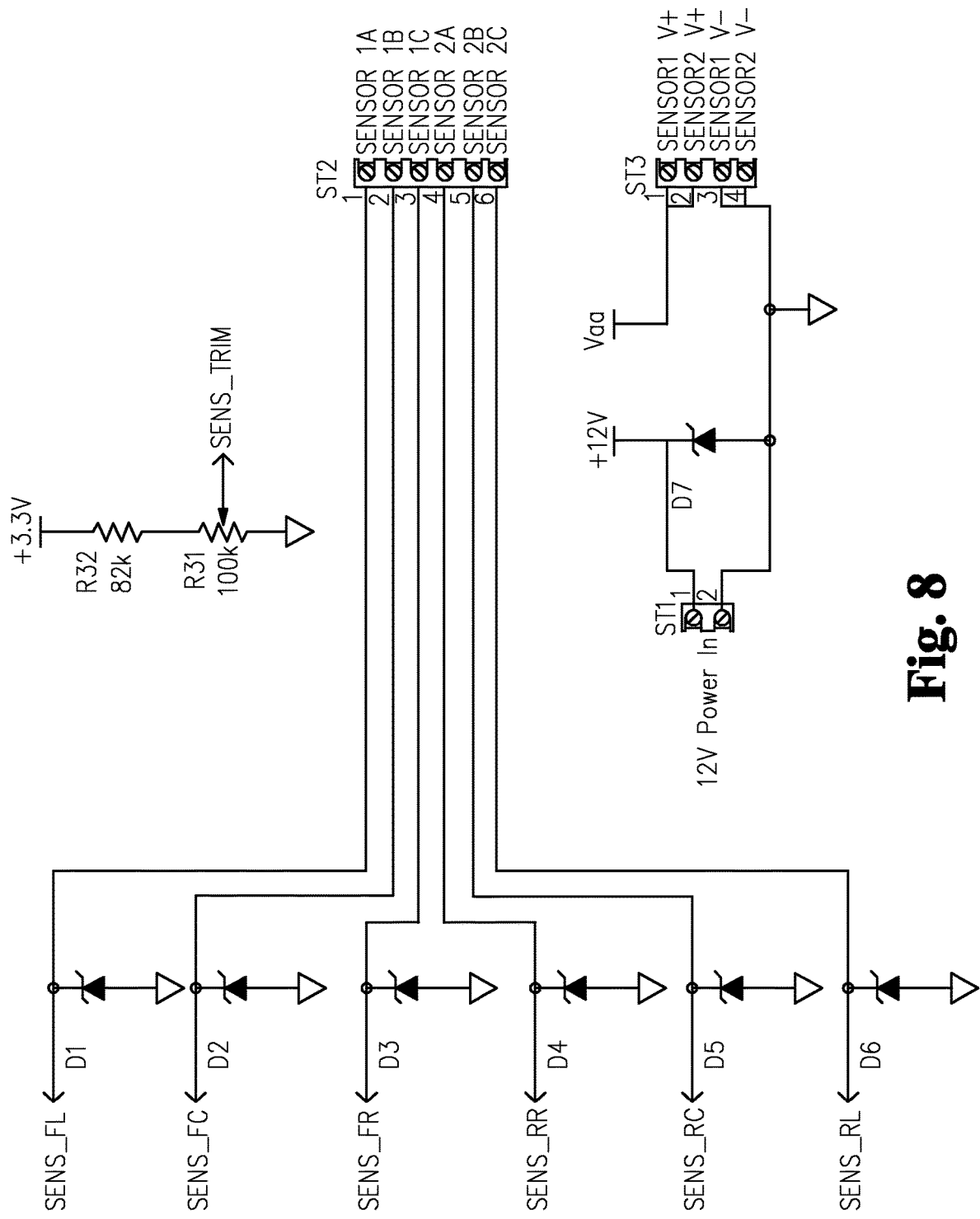
Figure 9A:
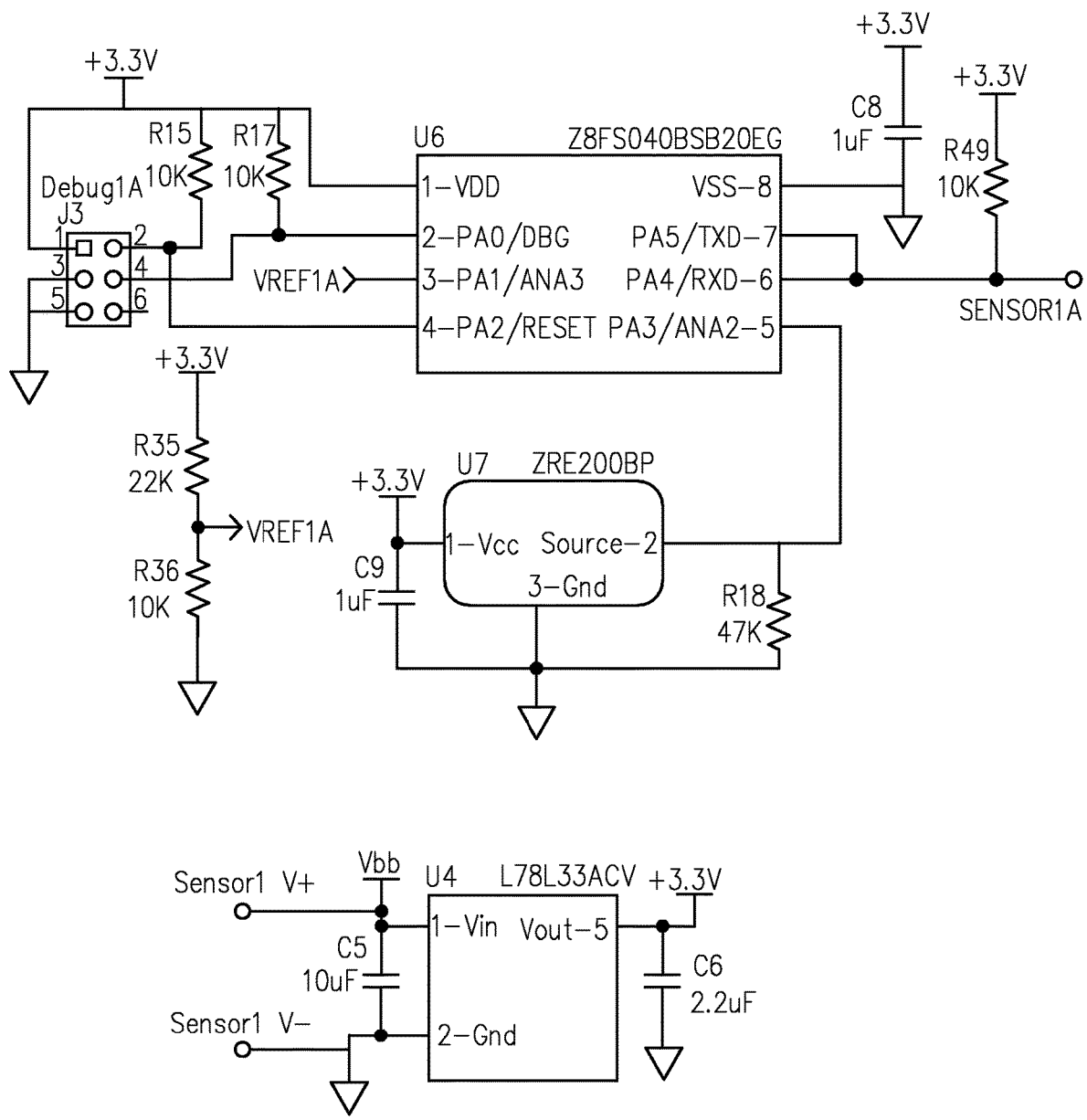
Figure 9B:
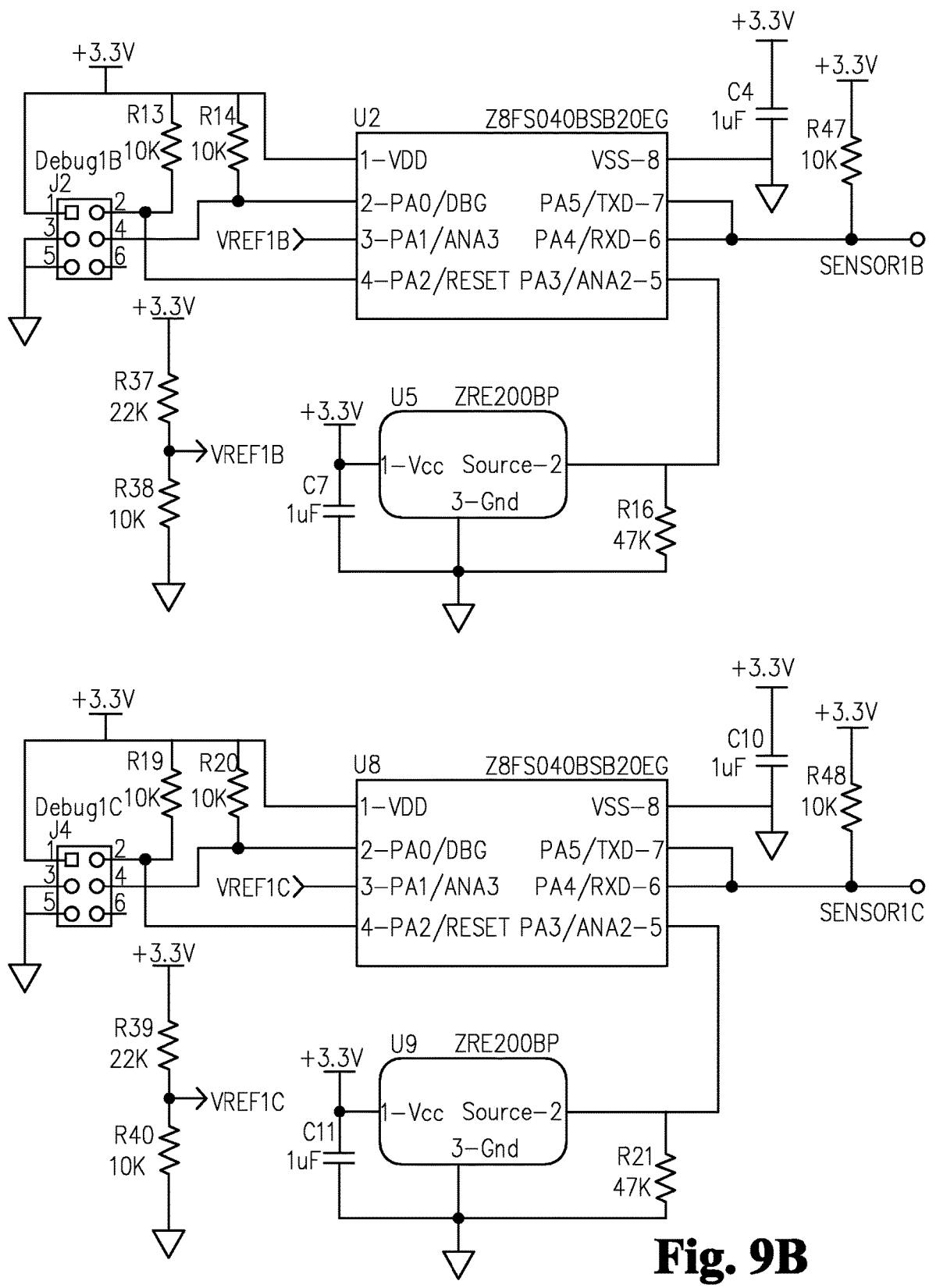
Figure 10A:
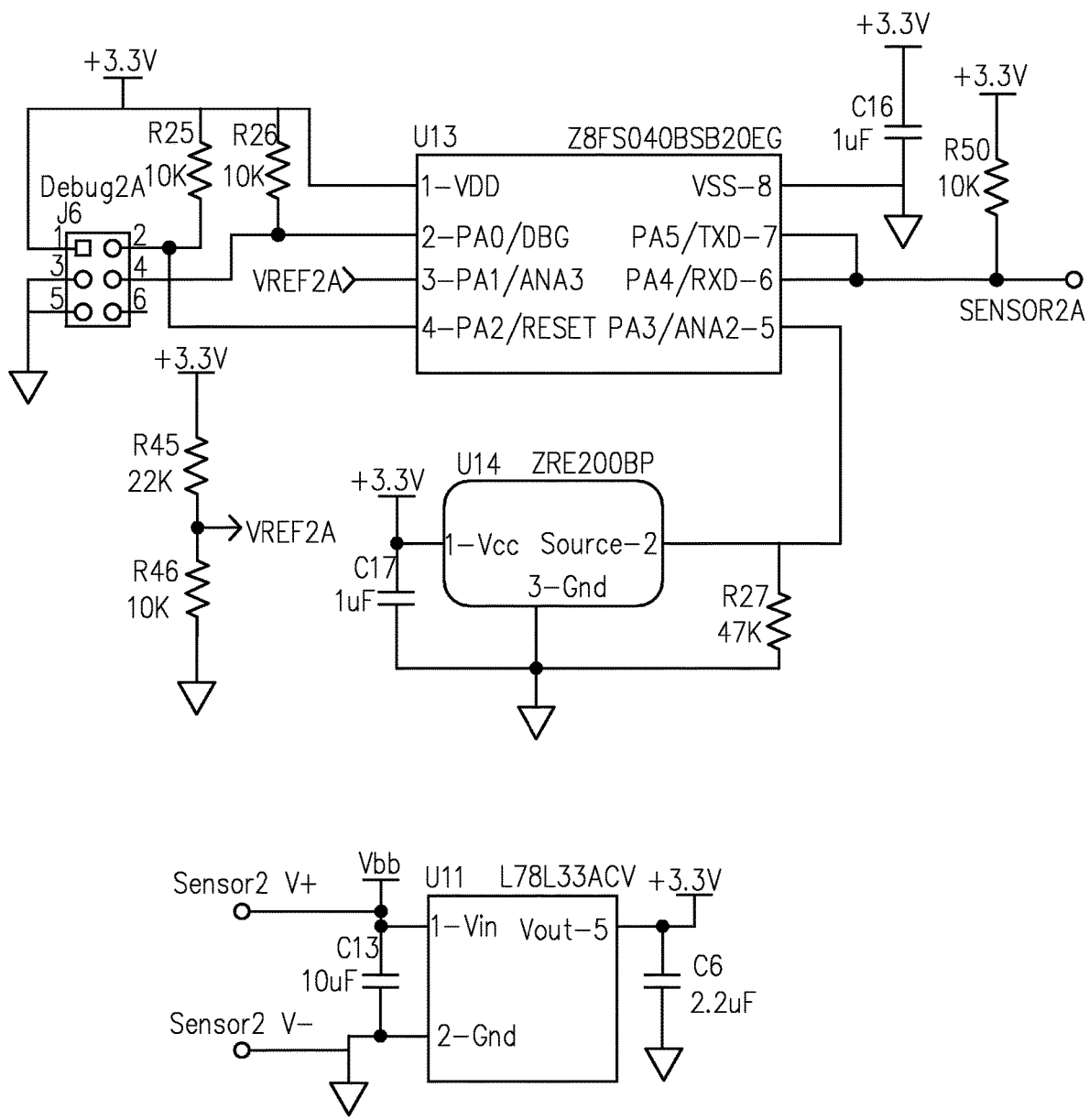
Figure 10B:
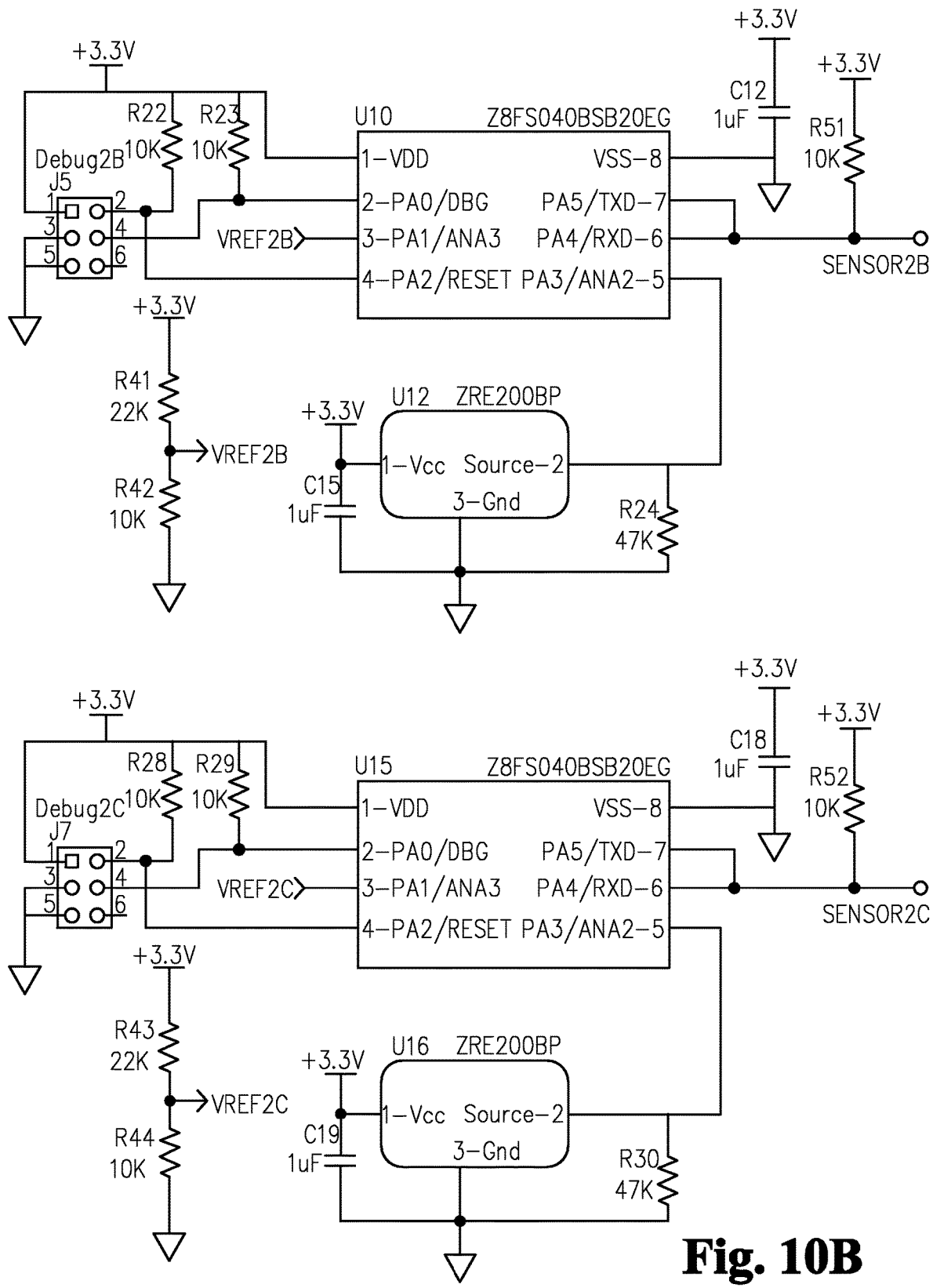

FIGS. 6 to 10B depict electrical schematic diagram of the computerized monitoring control unit of the vehicle perimeter alert system according to one embodiment of the invention. FIG. 6 depicts in detail the components and relationship of components comprising the video and audio display unit. FIG. 7 depicts in detail the wiring between two (2) pods used in one embodiment of the vehicle perimeter alert system. FIG. 8 shows the wiring of the video and audio display unit and the two (2) pods. FIGS. 9A, 9B, 10A and 10B are flex PCB diagrams for the PCBs to which the proximity sensors are attached.

Figure 11A:
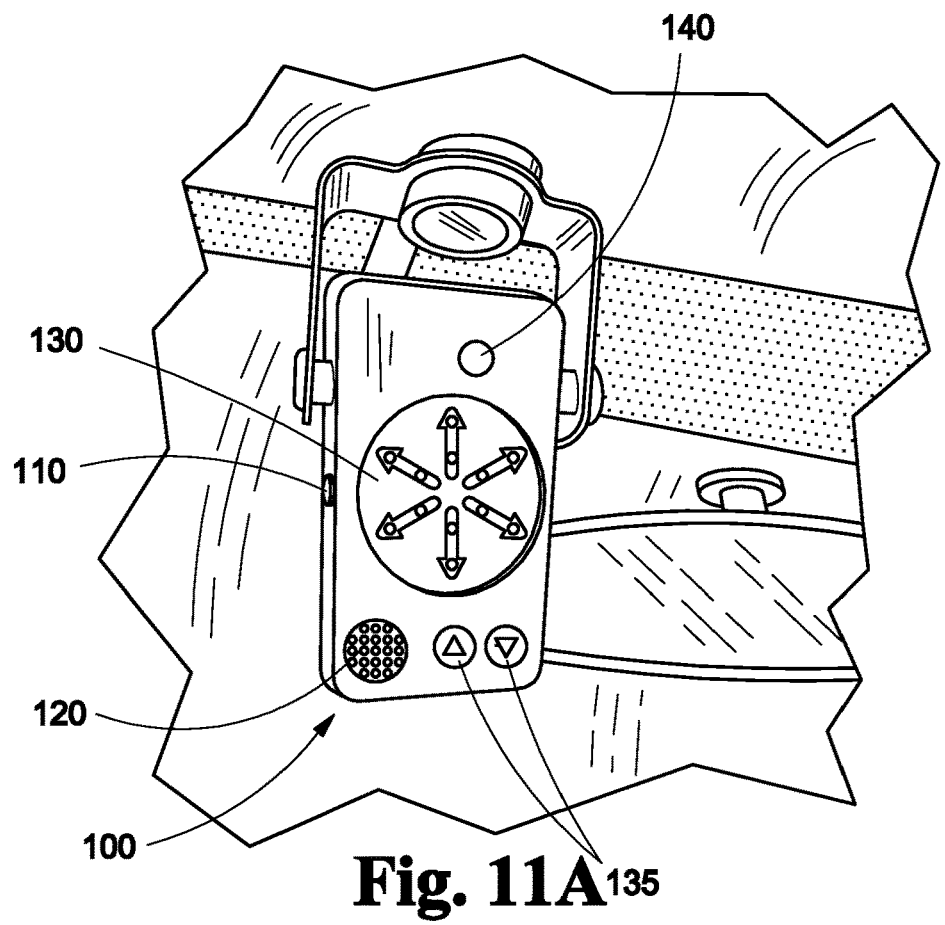
FIGS. 11A-11B are views of the video and audio display unit of FIG. 1 installed and in use.
Figure 11B:
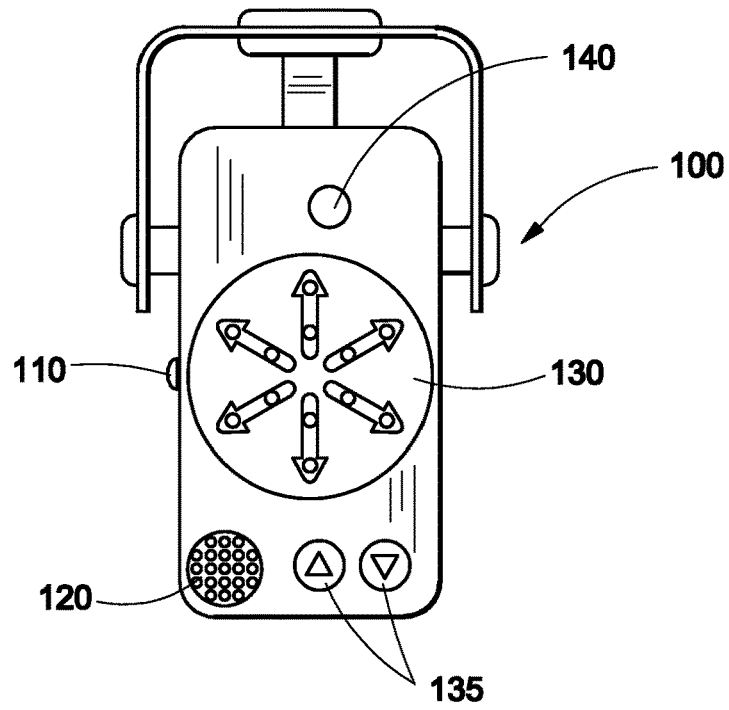

FIGS. 11A-11B are views of the video and audio display unit 100 of FIG. 1 installed and in use in a vehicle. Power switch 110 allows the video and audio display unit 100 to be powered on and off. Stand-by button 140 permits a user to toggle between stand-by mode and active scanning mode. Speaker 130 sounds audio warnings when intrusion is indicated by signal received from a proximity sensor 210. Speaker 130 volume can be controlled by volume controls 135. Visual display 120 indicates which proximity sensor has detected motion.

Figure 12C:
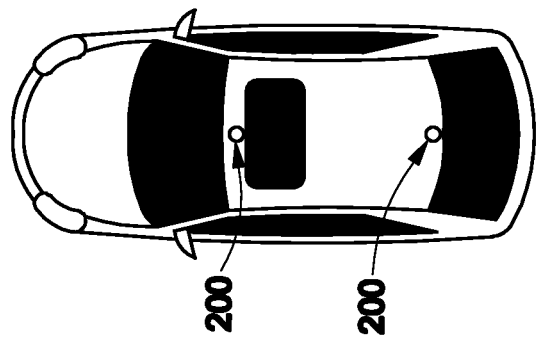
FIGS. 12A-12C are top views of vehicles having two pods installed on the roof.
Figure 12B:
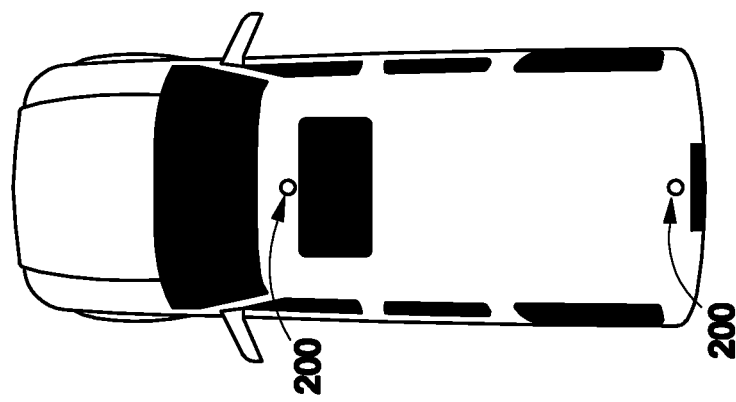
Figure 12A:
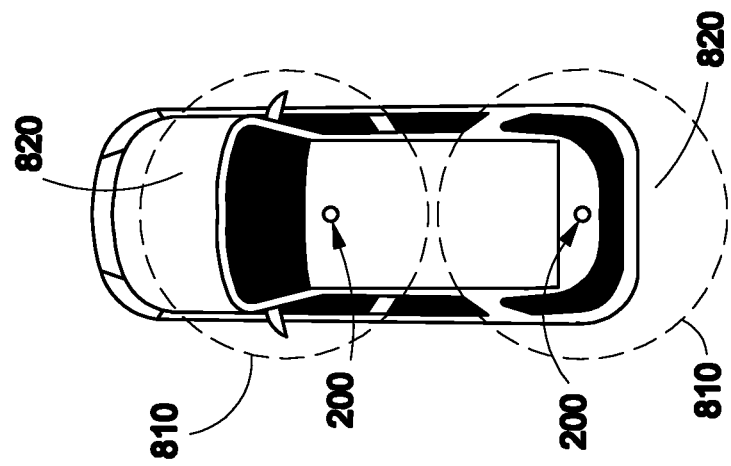

FIGS. 12A to 12C are top views of vehicles having two pods 200 installed on the roof. The detection range of the proximity sensors 210 housed in pod 200 is indicated by the dotted lines 810 in FIG. 12A, which lines define a detection field 820 for each vehicle that is set up by the proximity sensors 210. The size of the detection fields 820 constitute the monitoring areas for the vehicle perimeter alert system for each vehicle, the size of which can be adjusted by the number of proximity sensors 210 used or settings of the proximity sensors 210.

The operation of the invention according to one embodiment of the invention is as follows. The video and audio display unit is turned on to active mode and the proximity sensors warm up. Once sufficient time has passed for the proximity sensors to warm up, for example 1 minute, a system integrity check is performed to determine that the proximity sensors are operational. Thereafter the computerized monitoring control unit begins monitoring for signals from the proximity sensors that responded as operational. The proximity sensors sense when a human body or other large mass comes within their monitoring areas. In a typical operating mode, the video and audio display unit causes visual and audio alarms to sound when a proximity sensor sends a signal indicating intrusion into its monitoring area. The audio alarm may be programmed to sound for a prescribed period of time, such as 60 seconds or less. In one embodiment, the audio alarm sounds for approximately 1 second. The visual alarm indicates which proximity sensors indicated motion within their monitoring areas.

While the invention has been described with reference to particular embodiments and applications, numerous variations and modifications could be made thereto by those skilled in the art without departing from the spirit and scope of the invention as claimed. Accordingly, the scope of the invention should be determined with reference to the claims

What is claimed is:

1. A system for detecting an intrusion into a detection field surrounding a vehicle by detecting a change in the field caused by the presence of an intruder in the detection field, comprising:

a plurality of proximity sensors, each proximity sensor monitoring a monitoring area, wherein each proximity sensor produces a signal upon detecting motion within the monitoring area;

a computerized monitoring control unit that receives the signals produced by the proximity sensors;

one or more alarms under control of the computerized monitoring control unit; and a visual and audio display unit housing the computerized monitoring control unit and the alarms;

wherein the plurality of proximity sensors is attached to the vehicle to provide 360° coverage of the vicinity of the vehicle, wherein further a sole attachment of the system to the vehicle consists of the physical mounting of the proximity sensors, the one or more alarms and the visual and audio display unit on the vehicle and the wiring of the system to the 12V power source of the vehicle, wherein further the system has no attachment, integration or communication with the computer or other data systems of the vehicle, wherein further the sole attachment of the system to the wiring of the system to the 12V power source of the vehicle solely provides power to the system, wherein the system has no control over the electrical system of the vehicle or any other device or system connected to the electrical system of the vehicle, wherein further the system has no control over any locking and unlocking system of the vehicle; any illumination device or light of the vehicle; any alarm system of the vehicle; or any speaker or any audio system of the vehicle.

2. The system of claim 1, wherein the alarms comprise a visual alarm, an audio alarm or combinations thereof.

3. The system of claim 2, wherein the proximity sensors comprise passive infrared-based sensors.

4. The system of claim 3, wherein one or more proximity sensors are housed in a housing external to the vehicle.

5. The system of claim 4, wherein three proximity sensors are housed in a housing external to the vehicle.

6. The system of claim 4, wherein the housing is attached to the roof of the vehicle.

7. The system of claim 4, wherein two housings are attached to the roof of the vehicle.

8. The system of claim 4, wherein the monitoring areas of adjacent proximity sensors overlap in coverage.

9. The system of claim 1, wherein the vehicle comprises a car, a boat or a motorcycle.

10. The system of claim 9, wherein the vehicle comprises a law enforcement car.

* * * * *